Patented Aug. 5, 1952

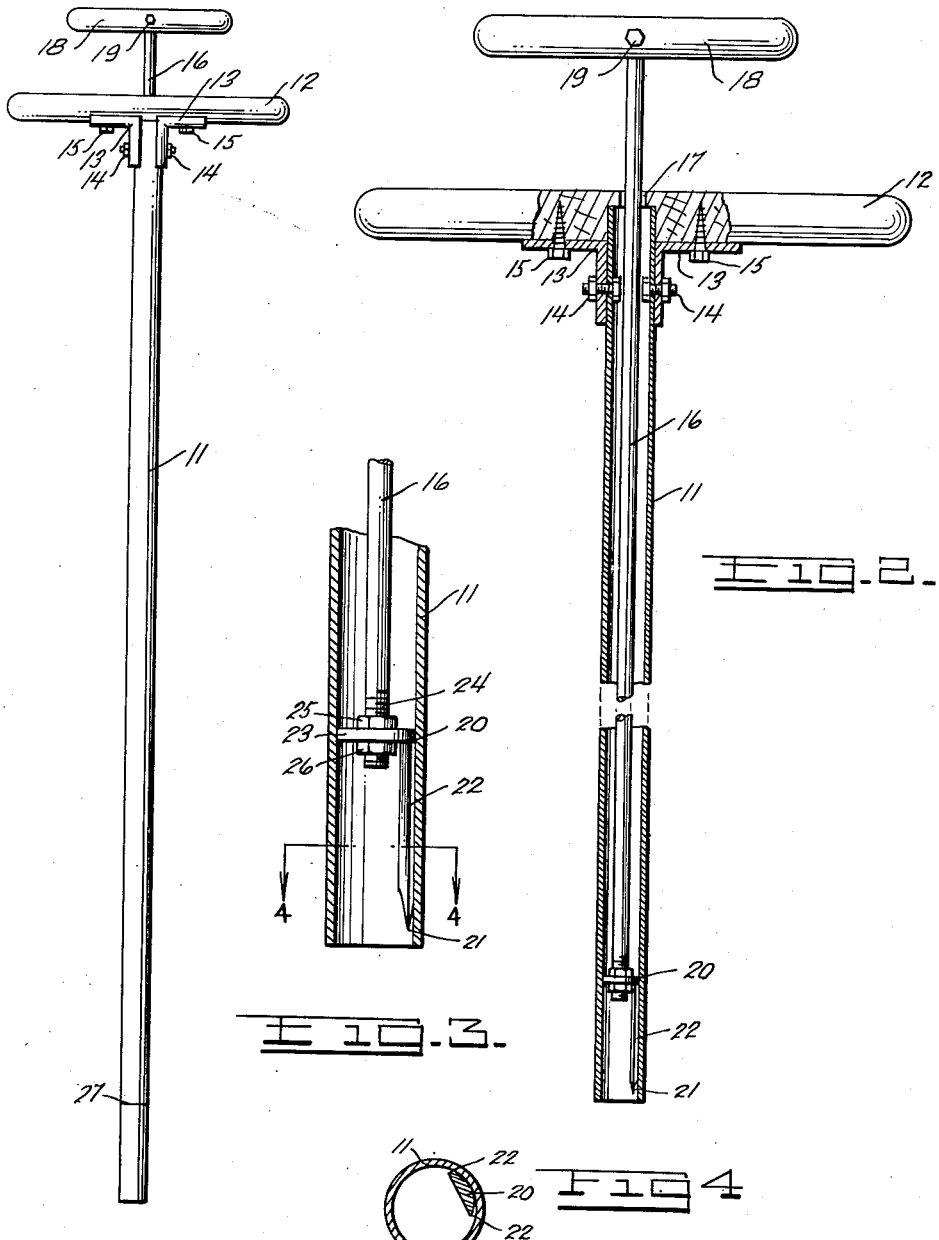

2,606,055

UNITED STATES PATENT OFFICE 2,606,055

WEEDING IMPLEMENT

Robert Johnson, Detroit, Mich.

Application May 27, 1949, Serial No. 95,786

2 Claims. (Cl. 294—50.6)

This invention relates to weeding devices and is more particularly concerned with implements for the removal of weeds from the ground.

An object of this invention is the provision of an implement of the character mentioned which may be used to completely eradicate obnoxious weeds, particularly those of the long-rooted species, such as dandelion, thistle, wild carrot and others.

Another object of the invention is the provision of a weeding implement which removes the entire root of the weed from the soil with a minimum of destruction to the surrounding soil.

A further object of the invention is the provision of a weeding implement which functions in a manner such that the soil can be replaced and tamped down with the same implement after the weeds are removed, thereby eliminating pitted or lumpy surfaces on the ground from which the weeds have been removed.

These and other objects and advantages of the invention will be apparent from the following description considered together with the accompanying drawing, in which drawing:

Figure 1 is a front elevational view of an embodiment of the invention.

Figure 2 is a longitudinal cross-sectional view of the same embodiment.

Figure 3 is an enlarged view of the lower end of Figure 2.

Figure 4 is a section along the line 4—4 of Figure 3.

Referring with more particularity to the drawing in which like numerals designate like parts, the embodiment illustrated comprises an elongated tubular member 11 adapted to be normally disposed in a vertical position. A handle bar 12 is held on the top of the tubular member by means of angle brackets 13 secured to the tube by bolts 14 passing through the vertical legs of the brackets and screws 15 passing through the horizontal legs of the brackets into the body of the bar. However, other suitable means for securing the bar to the tubular member may be used.

Within the tubular member 11, there is slidable and rotatably disposed a longitudinal rod 16, the upper end of which projects through the upper end of the tubular member 11 and through an aperture 17 in the middle of the handle bar 12.

The upper end of the rod 16 is also provided with a handle bar 18 which is secured thereto by a pin 19 or other suitable means.

The lower end of the rod is attached to a bayonet member or blade 20 of semi-coniform shape and curvature to fit the inside wall of the tubular member 11. The blade 20 also has a pointed end 21 and a cutting edge 22 on either side. The upper end of the blade is provided with a horizontal flange 23 which has an aperture therethrough adapted to fit over the lower end of the rod 16. Threads 24 are provided at said lower end to engage a pair of co-operating nuts 25 and 26 which straddle the flange 23 and hold the blade secure to the rod.

The implement is preferably provided with a depth mark 27 on the outside of the tube 11 and about two inches from the bottom thereof. This may be accomplished by painting the rod down to this point.

The implement is used by inserting the lower end of the tube 11 in the ground over the weed to be eradicated to the depth indicated by the depth mark 27, thereby loosening the soil around the roots of the weed and permitting it to be withdrawn when the device is elevated. To remove the soil from the bottom of the tube, the blade 20 is rotated by turning the handle bar 18 and pushing it inwardly.

The hole left in the ground is then refilled with soil and tamped down with one of the handle bars 12 or 18.

What is claimed is:

1. A device for the removal of weeds comprising a tubular section, a handle bar arranged adjacent one end of said section and fixedly secured thereto, a rod positioned within said tubular section having one end extending through said one end of said section and said handle bar, and mounted in said tubular section for rotatable and reciprocatory movement, a disc circumposed about and fixedly secured to the other end of said rod and slidably engageable with the wall of said tubular section, a longitudinally extending blade positioned in end to end relation with respect to the other end of said rod and having one end fixedly secured to said disc adjacent the periphery thereof, said blade being of semi-coniform shape and of a curvature to conform to the inside wall of said tubular section, and hand actuable means on the projecting end of said rod for effecting the rotational and reciprocatory movement of the latter.

2. A device for the removal of weeds comprising a tubular section, a handle bar circumposed about said section adjacent one end thereof and fixedly secured thereto, said handle bar being provided with an aperture in registry with said one end of said tubular section, a rod positioned within said tubular section having one end extending loosely through said handle aperture and projecting beyond said handle, and mounted in said tubular section for rotatable and reciprocatory movement, a disc circumposed about and fixedly secured to the other end of said rod and slidably engageable with the wall of said tubular section, a longitudinally extending blade positioned in end to end relation with respect to the other end of said rod and having one end fixedly secured to said disc adjacent said periphery thereof, said blade being of semi-coniform shape and of a curvature to conform to the inside wall of said tubular section, and hand actuable means on the projecting end of said rod for effecting the rotational and reciprocatory movement of the latter.

ROBERT JOHNSON.

REFERENCES CITED

The following references are of record in the file of this patent:

UNITED STATES PATENTS

| Number | Name | Date |
|---|---|---|
| 39,560 | Fitts et al. | Aug. 18, 1863 |
| 58,794 | Ellerbe | Oct. 16, 1866 |
| 522,039 | Baldridge | June 26, 1894 |
| 576,703 | Tyson | Feb. 9, 1897 |
| 1,548,865 | Bull | Aug. 11, 1925 |
| 1,644,426 | Gentsch | Oct. 4, 1927 |
| 1,653,777 | Miotke | Dec. 27, 1927 |
| 1,783,026 | Ober | Nov. 25, 1930 |
| 1,939,897 | Hill | Dec. 19, 1933 |